United States Patent
Bowers et al.

[11] 3,752,598
[45] Aug. 14, 1973

[54] SEGMENTED DUCT SEAL

[75] Inventors: David A. Bowers, Madison; Frank L. Detolla, Rockville, both of Conn.

[73] Assignee: United Aircraft Corporation, East Hartford, Conn.

[22] Filed: Nov. 17, 1971

[21] Appl. No.: 199,552

[52] U.S. Cl. ................................ 415/173, 415/217
[51] Int. Cl. .............................................. F01d 5/20
[58] Field of Search .... 415/134–139, 170–173, 217; 416/219, 220, 221, 193; 277/168, 171, 236

[56] References Cited
UNITED STATES PATENTS

| 3,709,631 | 1/1973 | Karstensen et al. | 416/220 |
| 3,393,894 | 7/1968 | Redsell | 415/217 |
| 3,479,063 | 11/1969 | Raver | 277/171 |
| 2,934,316 | 4/1960 | Watson et al. | 415/136 |
| 3,146,992 | 9/1964 | Farrell | 415/136 |
| 3,542,483 | 11/1970 | Gagliardi | 415/217 |
| 3,551,068 | 12/1970 | Scalzo et al. | 415/173 |

Primary Examiner—C. J. Husar
Attorney—Charles A. Warren

[57] ABSTRACT

Confronting faces of a segmented duct of circular cross-section are provided with mutually opposing grooves running transverse to the front plane of the duct, the grooves each having a tapered surface, the tapered surfaces of opposing grooves being in mutually facing relationship with each other. A thin flat rectangular plate bridges the gap between the tapered surfaces, having one of its longitudinal edges resting on each surface. A net force on the plate created for example by a pressure differential across the plate results in a seal between the tapered surfaces and each plate edge, thereby preventing the radial leakage of fluid through the gap between the segments.

5 Claims, 6 Drawing Figures

Patented Aug. 14, 1973
3,752,598
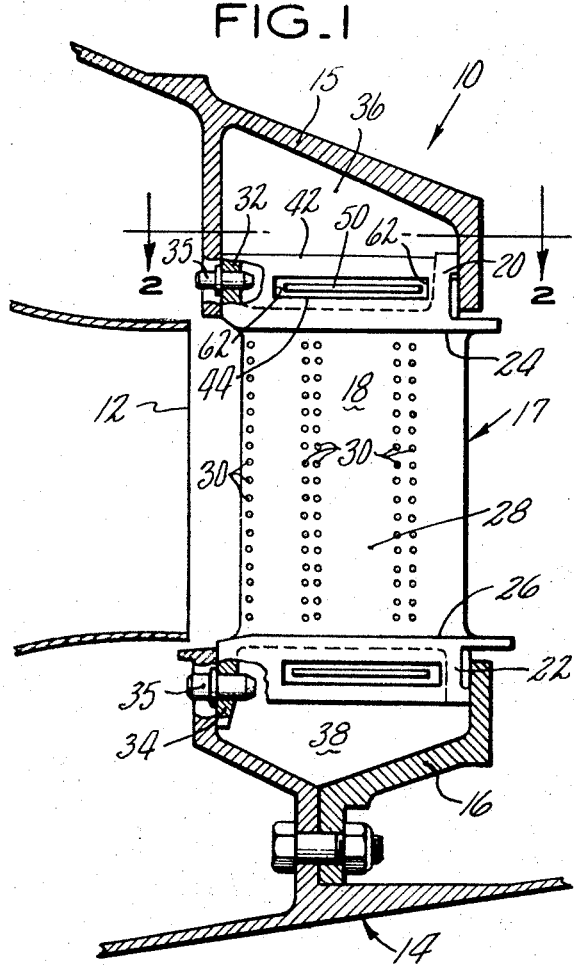
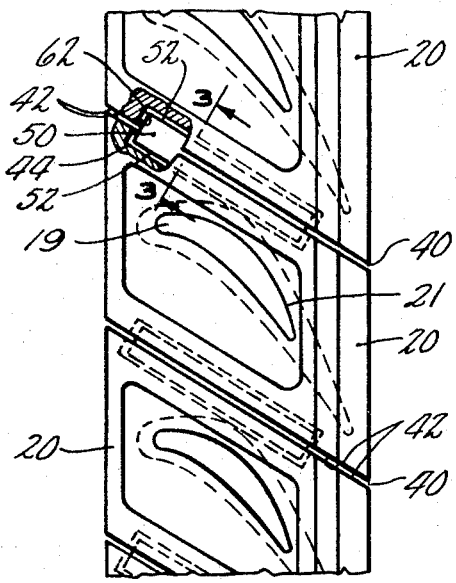
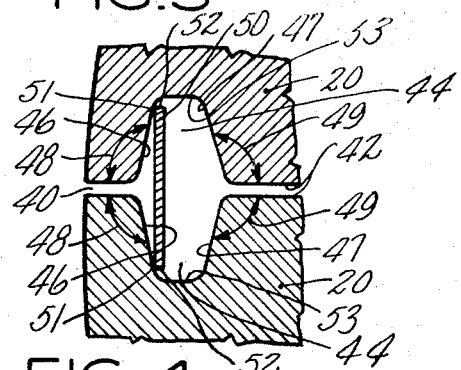
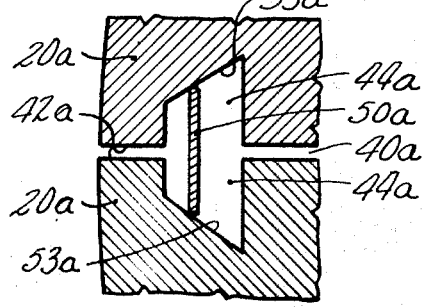
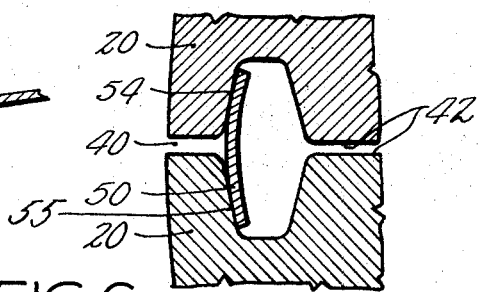
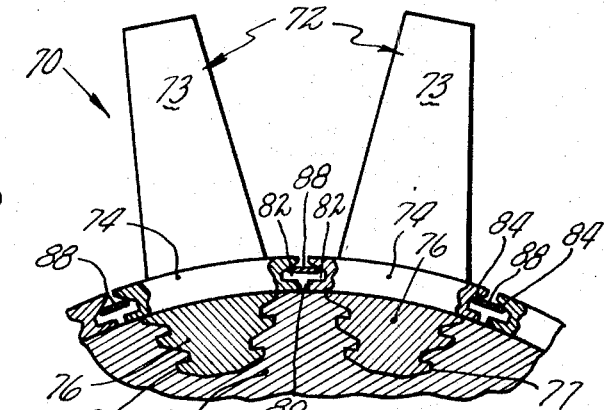
INVENTORS
DAVID A. BOWERS
FRANK L. DeTOLLA
BY Charles A. Warren
ATTORNEY

SEGMENTED DUCT SEAL

The invention herein described was made in the course of or under a contract with the Department of the Air Force.

BACKGROUND OF THE INVENTION

1. Field of Invention

This invention relates, generally, to a seal for preventing radial leakage of fluid between the segments of a segmented duct.

2. Description of the Prior Art

A duct having a curvilinear cross-section, inner and outer surfaces and front and back edges is often used to separate two fluids. This duct, for example, may constitute a portion of the gas path wall in a gas turbine engine, with cooling air flowing along one surface and the working fluid flowing along the other. In some instances the duct will be subjected to high temperatures which will cause it to expand creating undesirable stresses within the duct. For this and other reasons the duct may be cut from its front to back edge in several locations forming longitudinal segments having confronting faces therebetween. Gaps are provided between the confronting faces to allow for thermal expansion. If the fuilds on each side of the duct are under different pressures, leakage will occur through the gaps. In order to prevent this radial leakage of fluid through these gaps a sealing means must be provided.

It is known to provide opposing grooves of rectangular cross-section in said confronting faces, running from the front to the back of the segments. Within the cavity formed by the opposing grooves is a flat thin rectangular plate which is of sufficient width to bridge the gap between the segments. A pressure differential across the plate forces the plate toward the inner or outer surface of the duct against the surfaces of the grooves. As long as these groove surfaces remain substantially parallel and in the same plane, good sealing is accomplished over the length of the plate. However, due to thermal expansion and also because of unavoidable hardware tolerances of the parts these surfaces often move with respect to one another becoming misaligned and skewed. The plate is then unable to maintain sufficient contact with the surfaces and is thus unable to provide a good seal. It is apparent, for example, that even if the surfaces are parallel a small amount of mismatch between the grooves in a direction perpendicular to said surfaces may result in the plate resting on the surface of only one groove without coming into any contact with the surface of the opposing groove. Additionally, if said surfaces are skewed with respect to one another, maintaining contact along the entire length of both surfaces would require that the plate bend around the edge of one of the grooves. One or the other lengthwise edges of the plate will then necessarily lift off the surface of one of the grooves leaving a clear path through which fluid can leak. The plate is, of course, limited in flexibility and would not be able to provide good sealing under such circumstances unless said skewness were extremely small.

Another method which has been used in the past to seal such a gap is a tongue and groove along the confronting faces running from the front to the back of the segments. But sealing problems exist with the tongue and groove design to an even greater extent because the tongue, being integral with one of the segments, is even less flexible than a separate plate.

SUMMARY OF INVENTION

Accordingly it is an object of the present invention to provide a sealing means to prevent radial leakage of fluid through the gaps of a segmented duct.

It is a further object of the present invention to provide sealing means between said gaps wherein the sealing means does not interfere with the thermal expansion of the segments and provides adequate sealing throughout said thermal expansion.

It is another object of the present invention to provide sealing means between said gaps wherein the sealing capability is maintained despite radial mismatch and skewness between the segments.

According to the present invention, a duct of curvilinear cross-section, adapted to separate two fluids under different pressures, is made up of longitudinal segments said segments having confronting faces transverse to the plane of the front edge of the duct, said faces being in substantially parallel relationship to each other with gaps therebetween wherein at least one longitudinal groove is provided within each face, said groove being in opposing relationship to the groove in the confronting face, each groove having at least one tapered surface, said surface being in mutually facing relationship with the taper surface on the opposing groove; a plate is disposed within said opposing grooves, wide enough to bridge the gap therebetween, the longitudinal edges of said plate adpated to contact said mutually facing tapered surfaces, said plate being responsive to a force which presses the plate into continuous sealing contact with said tapered surfaces thus preventing radial leakage through the gap between the segments.

This force may be created by a pressure differential, centrifugal load, spring, or other means. If the force is sufficiently large the plate will bend until it conforms itself to the tapered surface. In that case an even better seal will be created by the surface-to-surface contact instead of the line-on-line seal which simple edge contact would provide. Except for the limits of the flexibility of the plate itself, there is nothing to prevent the edges or surface of the plate from coming into contact with the tapered surfaces even though these surfaces may be misaligned or skewed with respect to one another. As hereinbefore discussed, the prior art seal with rectangular grooves is severely limited in its sealing capability under such conditions.

It can be seen that this invention does not in any way interfere with the relative motion between the segments as would the aforementioned tongue and groove seal. Also, as already stated, since the tongue is integral with one of the segments it has limited flexibility. Generally the tongue and groove design relies on close tolerances to perform its sealing function. Comparative testing between a tongue and groove design and this invention, as it is hereinafter described in the preferred embodiment, has shown that the sealing effectiveness of this invention is four times that of a tongue and groove.

The foregoing and other objects, features and advantages of the present invention will become more apparent in the light of the following detailed description of the preferred embodiment thereof as illustrated in the accompanying drawings.

BRIEF DESCRIPTION OF THE DRAWING

FIG. 1 is a partly sectioned, partial elevation view of a first stage turbine vane assembly embodying the invention;

FIG. 2 is a developed partial sectional view partly broken away taken along the line 2—2 in FIG. 1, with the inner turbine casing removed;

FIG. 3 is a sectional view taken along the line 3—3 in FIG. 2, rotated 90°, particularly illustrating the invention;

FIG. 4 is a sectional view taken along line 3—3 in FIG. 2, rotated 90°, showing an alternate form of the invention;

FIG. 5 is a sectional view taken along line 3—3 in FIG. 2 rotated 90°; and

FIG. 6 is a partly sectioned, partial elevation view of a rotor assembly embodying the invention.

DESCRIPTION OF THE PREFERRED EMBODIMENT

Referring now to FIGS. 1 and 2, a first stage turbine stator assembly 10 of a gas turbine engine is spaced downstream of a burner duct 12 and includes an outer turbine casing 14, including a flanged ring 16, and an inner turbine casing 15 providing support for a plurality of stator vanes 17 circumferentially disposed between said casings, each vane comprising a substantially radial airfoil 18 having a central void 19, an inner shroud 20 having an airfoil shaped hole 21 communicating with the central void 19, and an outer shroud 22 having a similar hole (not shown) also communicating with said central void 19, said shrouds forming the inner and outer walls 24 and 26, respectively, of an annular gas path 28 which receives hot gas from the burner 12. Each airfoil 18 is also provided with holes 30 connecting the central void 19 of the airfoil with the gas path 28. Each inner and outer shroud 20 and 22 is provided with an upstream flange 32 and 34, respectively, for attachment to turbine casings 14 and 15 by pins 35. An inner annular chamber 36 and an outer annular chamber 38 formed between the supporting structure 14 and 15 and the vane shrouds 20 and 22, are provided with cooling air under pressure which is fed into the holes 21 in each of the inner and outer shrouds, through the hollow airfoils 18, and out holes 30 to cool the surfaces of the airfoils. In order to obtain maximum efficiency and to maintain proper cooling of the vanes 17, the air in the gas path 28 must be kept separated from the cooling air in chambers 36 and 38. Gaps 40 between adjacent shrouds 20 in FIG. 2, and similar gaps (not shown) between the shrouds 22, provided to allow for thermal expansion, must be sealed to prevent radial leakage therethrough.

Although hereinafter the description is restricted to the seal between the inner shrouds 20 it should be noted that a similar sealing means is used between the outer shrouds 22. Each pair of adjacent shrouds 20 has confronting faces 42 (FIGS. 2 and 3). Said faces are each provided with grooves 44 (FIGS. 1-3). The grooves run substantially from the upstream end of the face to the downstream end of the face. As best shown in FIGS. 2 and 3, the grooves on confronting faces are in substantially opposing relationship to one another, and each has an inner and outer surface 46, 47, respectively, and a bottom surface 53. Both the inner surface 46 and the outer surface 47 of each groove are tapered, the taper angles 48 and 49 between face 42 and the surface 46 and 47, respectively, being greater than 90°. A thin flat rectangular plate 50 is disposed within said facing grooves. A net force on the plate created by the difference in gas pressure in the chamber 36 and in the gas path 28 causes the plate to be pressed against the pair of mutually facing tapered surfaces 46 (or 47 depending on the direction of the force) forming a seal between the edges 51 of the longitudinal sides 52 of the plate and the tapered surfaces 46 preventing radial leakage of fluid. As shown in FIG. 4, in accordance with the invention, the tapered surfaces of the grooves may be the bottom surfaces 53a of the grooves 44a.

As the plate becomes thinner and as the pressure differential across the plate increases the seal between the edges of the plate and the tapered surfaces becomes better. Best possible sealing is achieved when the plate is made thin enough such that the pressure differential across the plate forces it to bend until it conforms with the tapered surfaces of the grooves as shown in FIG. 5. Under these conditions surface-to-surface contact is obtained at 54 and 55. It is desirable, however, that the plate regain its original shape when the force is removed because the grooves do not remain exactly in the same relationship to one another during engine operation. The plate must also be able to withstand the forces on it. Thus, if the taper is too steep or the plate too thin, the plate may bend past its tensile limits and break or not return to its original shape. If the plate is not flexible enough and the taper is too steep the flexibility limits of the plate may prevent proper sealing even along the edges 51. In any event, after a certain point, as the plate is further decreased in thickness there is a diminishing return in increased sealing effectiveness because most of the sealing has already been accomplished. If the taper is too shallow the groove approaches a rectangular cross-section and the seal will have the problems associated with a rectangular shape as hereinbefore discussed.

Another consideration in the design of this seal and one which may often determine the final groove configuration is the fact that the plate should not be able to fall out of the grooves. In the preferred embodiment if this should happen the plate might end up in the engine gas path 28 and damage other parts further downstream. Thus, in FIG. 3 the width of the plate 50 in conjunction with the depth and opening of the grooves 44, should be such as to prevent the plate from being able to rotate and fall into the gap 40 between the shrouds. Also, the bottom 53 of the groove should be wide enough so that the plate cannot become wedged between the surfaces 46 and 47.

In a typical operation of an engine incorporating an embodiment of the invention the temperature of the cooling air in the chamber 36 is about 1,100°F and the temperature in the gas path 28 near the wall 24 is about 2,250°F resulting in a temperature differential across the plate 50 of approximately 1,150°F. Typical pressures in the chamber 36 and the gas path 28 are 380 psi and 280 psi, respectively, resulting in a pressure differential across the plate of approximately 100 psi. Under these conditions AMS 5536 is a suitable material for the plate. The plate is 0.009 inch thick with a width of 0.215 inch. The taper angles 48 and 49 are both 14°30′, and the groove opening is 0.120 inch while the groove depth is 0.115 inch. As stated hereinbefore, the seal of this embodiment has reduced leakage by a factor of four over a tongue and groove design operating under identical conditions.

There is the possibility in this application that the force across the plate would reverse directions due to changing pressures in the gas path 28 and in the chambers 36 and 38. For this reason both sides 46 and 47 of the grooves are tapered so that sealing will be accomplished if the pressure in the chamber 36 is either higher than or lower than the pressure in the gas path 28. FIGS. 3 through 5 show the position of the plate when the former condition exists. If that condition were the only one possible, then the surface 47 would not need to be tapered.

Also, in this embodiment the grooves 44 do not extend across the full length of the shroud faces 42 and thus the plate 50 is trapped by the ends 62 of the grooves. An alternate configuration might have the grooves extending across the full length of the shroud faces; in such a case, end plates or other suitable means at the upstream and downstream ends of the grooves may be utilized to trap the plate.

FIG. 6 shows a further application for this invention. A portion of a rotor assembly 70 of a gas turbine engine is shown. Said rotor assembly comprises a hub 71 and a plurality of rotor blade assemblies 72. Each of said rotor blade assemblies comprises an airfoil 73, an inner shroud 74 and a fir tree shaped root 76. Said fir tree shaped root is attached to said hub by means of fir tree shaped slots 77 in said hub. Confronting faces 80 of adjacent shrouds 74 each contain a groove 82. These grooves are similar in design to the grooves hereinabove described for the stator vane assembly. In this application, however, the groove surface which is tapered is the radially outermost surface 84. A flat plate 88 is disposed within a pair of opposing grooves. The centrifugal force created by the rotating hub 71 will press said plate into sealing relationship with the tapered surfaces 84.

Although the invention has been shown and described with respect to a preferred embodiment thereof, it should be understood by those skilled in the art that the foregoing and various other changes and omissions in the form and detail thereof may be made therein without department from the spirit and the scope of the invention.

Having thus described a typical embodiment of our invention, that which we claim as new and desire to secure by Letters Patent of the United States is:

1. A fluid pressure seal assembly, which comprises: a duct adapted to separate fluids which are under different pressures, said duct having a circular cross section and comprising a plurality of longitudinal segments, adjacent segments having confronting faces, each face having at least one length-wise groove to provide at least one pair of opposing lengthwise grooves in said confronting faces, each groove of said pair having at least one tapered surface, the tapered surface of one groove being in mutually facing relationship with the tapered surface of the opposing groove; and
a plurality of flat plates each loosely disposed within a related pair of opposing grooves, and each having two straight parallel longitudinal edges, said longitudinal edges of said plate, in the presence of a radial fluid pressure differential, being in fluid sealing contact with said mutually facing tapered surfaces of opposing grooves to provide a fluid seal between said confronting faces solely as a result of the fluid pressure acting on said plate in a radial direction.

2. The fluid pressure seal assembly according to claim 1 wherein said plate is flexible and additional contact between the surface of the plate and the mutually facing tapered surfaces occurs in the presence of a fluid pressure differential.

3. A turbine stator assembly comprising:
an annular inner casing;
an annular outer casing surrounding said inner casing thereby forming an annular passageway therebetween;
a plurality of vanes, said vanes distributed circumferentially within said annular passageway and each comprising an inner shroud, an outer shroud, and an airfoil therebetween, said shrouds forming the inner and outer walls of an annular gas path in the gas turbine engine, each of said airfoils having a central void, and each of said shrouds having a substantially radial hole therethrough which communicates with said airfoil central void forming a passageway through each of said vanes with an opening at both ends, each airfoil also having a plurality of holes forming passageways between said gas path and said central void, adjacent shrouds of each gas path wall having confronting faces, with at least one pair of opposing grooves in said confronting faces, each groove of said pair having at least one tapered surface, the tapered surface of one groove being in mutually facing relationship with the tapered surface of the opposing groove;
said inner and outer casings further comprising structure for supporting said inner and outer shrouds and for forming an inner annular chamber between said inner shrouds and said inner casing, and an outer annular chamber between said outer shrouds and said outer casing, said outer annular chamber and said inner annular chamber adapted to carry gases under pressures higher than gas path pressures for feeding through the holes in said inner and outer shrouds, into the central voids of the airfoils, out the holes in the airfoil connecting the central void with the gas path, and finally cooling the outer surface of the airfoils,; and
a plurality of flat plates, each having two straight parallel longitudinal edges, each disposed within a related pair of said opposing grooves in the inner and outer shrouds, said edges being adapted to contact the mutually facing tapered surfaces of the grooves in the presence of a pressure differential across said plate to provide a fluid seal between said confronting faces.

4. The assembly according to claim 3 wherein said plate is flexible and, in the presence of a pressure differential across said plate, is forced into additional fluid sealing contact between the surface of the plate and the mutually facing tapered surfaces.

5. A turbine stator assembly comprising:
an annular inner casing;
an annular outer casing surrounding said inner casing thereby forming an annular passageway therebetween;
a plurality of airfoils each having an inner and outer end, said airfoils distributed circumferentially within said annular passageway and each comprising a shroud at one end thereof, said shrouds forming a wall of an annular gas path in a gas turbine engine, said inner and outer casings further comprising structure for supporting said inner and outer ends of said airfoils, adjacent shrouds of said gas path wall having confronting faces, with at least one pair of opposing grooves in said confronting faces, each groove of said pair having at least one tapered surface, the tapered surface of one groove being in mutually facing relationship with the tapered surface of the opposing groove; and a plurality of flat plates each loosely disposed within a related pair of opposing grooves in said shrouds, and each having two straight parallel longitudinal edges, said edges of said plate, in the presence of a radial fluid pressure differential, sealingly contacting said mutually facing tapered surfaces of opposing grooves to provide a fluid seal between said confronting faces solely as a result of the fluid pressure acting on said plate in a radial direction.

* * * * *